United States Patent
Varma et al.

(10) Patent No.: US 7,298,806 B1
(45) Date of Patent: Nov. 20, 2007

(54) METHOD AND SYSTEM FOR DATA-AIDED TIMING OFFSET ESTIMATION FOR FREQUENCY SELECTIVE FADING CHANNELS

(75) Inventors: Gottimukkala Narendra Varma, Andhra Pradesh (IN); Kunwar Devesh, Andhra Pradesh (IN); Yeleswarapu Yoganandam, Andhra Pradesh (IN)

(73) Assignee: Hellosoft Inc., San José, CA (US)

( * ) Notice: Subject to any disclaimer, the term of this patent is extended or adjusted under 35 U.S.C. 154(b) by 766 days.

(21) Appl. No.: 10/757,934

(22) Filed: Jan. 15, 2004

(51) Int. Cl.
*H04L 7/00* (2006.01)
(52) U.S. Cl. .................................................. 375/354
(58) Field of Classification Search ................ 375/354, 375/371, 316, 355; 455/516
See application file for complete search history.

(56) References Cited

U.S. PATENT DOCUMENTS

| | | | |
|---|---|---|---|
| 5,363,412 A | 11/1994 | Love et al. | |
| 6,373,858 B1 | 4/2002 | Soleimani et al. | |
| 6,400,784 B1 * | 6/2002 | Ben-Eli | 375/365 |
| 7,016,404 B2 * | 3/2006 | Yang | 375/229 |
| 2001/0014114 A1 * | 8/2001 | Baltersee et al. | 375/148 |
| 2003/0179813 A1 * | 9/2003 | Morita et al. | 375/148 |
| 2005/0084025 A1 * | 4/2005 | Chen | 375/260 |

* cited by examiner

*Primary Examiner*—David C. Payne
*Assistant Examiner*—Leon Flores
(74) *Attorney, Agent, or Firm*—William L. Botjer (57) ABSTRACT

The disclosed invention provides a system, a method and a computer program product for timing offset estimation for frequency selective fading channels in wireless communication systems. The disclosed invention first obtains a corrected received signal using the received signal and a pre-estimated timing offset. The pre-estimated timing offset is further tracked in two steps. In the first step a plurality of probable deviations in the pre-estimated timing offset are considered. Then a training sequence is used to determine an expected signal corresponding to each of the probable deviations. The corrected received signal is then shifted through the probable deviations. Thereafter error factor between the expected signals and corresponding shifted received signals is obtained. The probable deviation yielding optimum error factor is then identified as the first estimate of the deviation in timing offset. This first estimate is then refined using correlation techniques to obtain an improved estimate of the deviation.

7 Claims, 6 Drawing Sheets

METHOD AND SYSTEM FOR DATA-AIDED TIMING OFFSET ESTIMATION FOR FREQUENCY SELECTIVE FADING CHANNELS

BACKGROUND

The present invention relates to the field of timing offset estimation in wireless networks. More particularly, the invention relates to a method and system for data-aided timing offset estimation for frequency selective fading channels.

In wireless communication, a timing offset is experienced between received and transmitted signals. The timing offset is caused by a number of distortions experienced in the channel due to factors such as multipath effects, frequency selective fading and unknown propagation delays. These timing offsets lead to errors in the channel response estimation and a consequent increase in the overall bit error rate (BER). Thus, timing offset estimation is an important aspect of wireless communication receivers.

Various approaches addressing the problem of timing offset estimation are known in the art. These approaches can be broadly classified into two categories—data-aided and non data-aided approaches. In a data-aided approach, a predefined sequence of symbols is embedded in the transmitted signal to aid the timing offset estimation. The sequence is known as a training sequence. The receiver has prior knowledge of the training sequence. It thus compares the known training sequence with the received training sequence for estimating the timing offset. In a non data-aided approach, use of such a training sequence is avoided, and the receiver achieves synchronization by extracting the information necessary for timing offset estimation from the modulated signal. The data throughput efficiency of data-aided approaches is lower than that of non data-aided approaches as a certain portion of the transmitted signal is assigned to the predefined sequence. However, the time taken for achieving synchronization in data-aided methods is significantly less than non-data aided methods. As the data rates provided by mobile devices are increasing, it has become essential to achieve faster synchronization. Therefore data-aided methods are preferred for use with mobile devices. Consequently, most wireless communication standards, such as the Global System for Mobile communication (GSM), provide a training sequence in the transmitted signal to facilitate data-aided timing offset estimation. Further many of these standards perform the timing offset estimation in two stages—acquisition and tracking. The first occurrence of the training sequence in the received signal is used to obtain an estimate of the timing offset during acquisition. Thereafter, in the tracking stage, the change in this estimate is tracked at subsequent occurrences of the training sequence to account for the time varying characteristic of the channel.

One approach of timing offset estimation is proposed in a research paper titled "A Fully Digital Feed forward MSK Demodulator with Joint Frequency Offset and Symbol Timing Estimation for Burst Mode Mobile Radio", authored by Ralph Mehlan, Yong-En Chen and Heinrich Meyr, published in IEEE Transactions, Vehicular Technology, VOL 42, No.4, November 1993 Pages 434-443. The method proposed in the publication uses a differential phase technique for estimating the timing offset for minimum shift keying (MSK) modulated signals subjected to flat fading in the channel. However, the method is non data-aided and does not consider frequency selective fading in the channel.

A data-aided method for timing offset estimation is proposed in the research paper "A Fully Digital Noncoherent and coherent GMSK Receiver Architecture with Joint Symbol Timing Error and Frequency Offset Estimation", authored by Yung-liang Huang, Kong-Dar Fan and Chia-Chi Huang, published in IEEE Trans, Vehicular Technology, VOL.49, No 3, May 2000 pages 863-874. In accordance with this method, the received signal is first passed through a frequency discriminator. The frequency discriminator outputs a frequency discriminated signal whose instantaneous amplitude is proportional to the instantaneous frequency of the received signal. Thereafter, the frequency offset is estimated using the training sequence and the Fast Fourier transform (FFT) of the frequency discriminated signal. The estimated frequency offset is then used to find a timing offset estimate. Although the method is a data-aided one, it does not consider the multipath effects of the channel.

In order to consider the multipath effects of the channel, data-aided methods use a correlation between the known training sequence and received signal for estimating the timing offset. Correlation-based techniques correlate the training sequence with the received signal shifted through various probable timing offsets and find out the offset value resulting in the maximum correlation. The maximum correlation point corresponds to the strongest multipath location. Thus the correlation-based techniques rely on the strongest multipath location and are suitable for use in a flat fading multipath channel environment.

A correlation based data-aided timing offset synchronization approach is proposed in U.S. Pat. No. 6,373,858 titled "Method and Apparatus of Adaptive Maximum Likelihood Sequence Estimation Using Filtered Correlation Synchronization" and assigned to Hughes Electronics Corporation, El Segundo, Calif. The patent discloses a signal structure with a reference data burst (training sequence) embedded in it for timing and frequency offset estimation. The patent further proposes a correlation-based method of timing synchronization using the proposed signal structure. In accordance with the method, a burst detector determines an occurrence of a reference data burst in the received signals. A first estimate of the frequency and timing offset is obtained using the detected burst. Thereafter, the correlation value between the first estimate of the frequency offset and its neighbors is interpolated assuming the timing offset to be equal to the first estimate of timing offset. The interpolation is used to obtain a fine estimate of the frequency offset. This fine estimate of the frequency offset is used to correct the received signal. The frequency corrected received signal is used to refine the estimate of the timing offset. Thus the timing offset estimate is used to refine the frequency offset and vice-versa.

The correlation-based data-aided method presented in U.S. Pat. No. 6,373,858 as discussed above relies on the strongest multipath location computed using correlation properties of the training sequence. In conditions with low signal to noise ratio, autocorrelation of these training sequences may be low. Also, the cross correlation of the training sequence with the data adjacent to the training sequence may be high. The problem is aggravated when the training sequences are short. For example, the training sequence provided by GSM systems for tracking are only 26-bits long. Considering the above facts, relying solely on correlation techniques for timing offset estimation does not achieve accurate results. Additionally, in frequency selective multipath conditions, the performance of equalizer depends on the exact knowledge of the delay profile rather than the strongest multipath location information. Consequently, various methods using the channel characteristic estimate for timing offset estimation have been developed.

One such method is disclosed in European Patent Application No. EP1292063A1 titled "Frame Synchronization Apparatus and Frame Synchronization Method" and assigned to Matsushita Electric Industrial Co., Ltd. The method disclosed in the above patent application considers a channel environment in which the level fluctuation, noise, or delay wave occurring due to fading fluctuations, are assumed to be absent. Thereafter, a predetermined known signal, i.e. the training sequence, is filtered through the considered channel to obtain a filtered signal. An ideal correlation value is calculated between the filtered signal and the predetermined known signal. The ideal correlation value is then time shifted through a predetermined shifting time. Additionally, an actual correlation value is obtained between the received signal and the predetermined known signal. The actual correlation value is further multiplied by a magnification factor. Then the square error between the shifted ideal correlation value and the magnified actual correlation value is found out. The shifting time corresponding to ideal correlation value at which the calculated square error is minimum is identified as the synchronization time, i.e. the timing offset.

The above method uses the channel transfer function for estimating the timing offset but assumes the channel transfer function to be constant over time. However, this assumption leads to inaccuracies in timing offset estimate as the actual channel characteristics vary with time. Various methods of obtaining dynamic channel estimate are known in the art. One such method, which obtains the channel dynamically and uses it for demodulation of the received signal, is described in U.S. Pat. No. 5,363,412 titled "Method and Apparatus of Adaptive Maximum Likelihood Sequence Estimation Using Filtered Correlation Synchronization", assigned to Motorola Inc., Schaumburg, Ill. The method described in the above patent uses the correlation between the received signal and the known transmitted signal to obtain an initial estimate of the timing offset and the channel transfer function. A Viterbi decoder then uses these initial estimates to decode the received signal. Thereafter, the decoded signal is filtered through the estimated channel to obtain an estimated channel-impaired signal. The error between the estimated channel-impaired signal and the received signal is then used to improve the channel estimate. The improved channel estimate is then used for demodulating the received signal. Even though the method estimates the channel dynamically, it obtains the timing offset using correlation techniques and does not use the dynamically calculated channel for timing offset estimation.

A method using dynamic channel estimation for timing offset estimation is described in WIPO Patent Application No. 0243271A2 titled "Joint Least-Square Synchronization, Channel Estimation and Noise Estimation" and assigned to Telefonaktiebolaget Lm Ericsson (Publ), Sweden. In accordance with the method disclosed in the above patent, a training sequence is received and the symbols in the received signal are divided into groups. For each of these groups, a set of linear equations is established. These equations estimate the channel using a least square error technique. The least square estimate thus calculated is used to determine a noise estimate for each group. The group having the least noise estimate is chosen as the synchronization group. Alternatively, the group with greatest signal to noise ratio can be selected as the synchronization group. The method performs dynamic channel estimation by calculating the least square error between the received and reference signal and use the channel estimate for achieving timing offset estimation. This makes the method suitable for frequency selective fading conditions. However, calculation of dynamic channel transfer function for a plurality of symbol groups is a computationally complex task. Therefore the method requires high processing power for execution. Mobile devices have limited processing resources. As a result, such computationally complex methods are not suitable for use with wireless receivers in mobile devices.

From the discussion of the prior art above, it is evident that the correlation-based methods of timing offset estimation known in the art rely on the estimation of the strongest multipath location. However, the knowledge of the channel's delay profile is required to accurately determine the timing offset in frequency selective fading channels. Furthermore, the delay profile or the channel characteristics do not remain constant over time. Dynamic determination of the delay profile or channel characteristics is a computationally complex task. As a result the methods using dynamic channel characteristics require high processing power. Therefore there exists a need for an approach providing the high accuracy attained by dynamic channel estimation while still retaining the computational efficiency of correlation based techniques.

SUMMARY

The disclosed invention is directed towards a method, a system and a computer program product for data-aided timing offset estimation for frequency selective fading channels in wireless communication systems. The synchronization point is defined with respect to the performance of the equalizer rather than based on the strongest multipath location (Conventional method). A point is chosen so as to capture as much multipath profile as possible to have efficient equalization.

An objective of the disclosed invention is to estimate the timing offset encountered in channels exhibiting multipath effects and frequency selective fading.

A further objective of the disclosed invention is to increase accuracy of timing offset estimation in frequency selective fading channels by using channel estimation.

Another objective of the disclosed invention is to reduce the computational complexity involved in estimation of the timing offset.

Yet another objective of the disclosed invention is to achieve accurate timing offset estimate in channel conditions with low signal to noise ratio (SNR).

Still another objective of the disclosed invention is to increase the accuracy of data-aided timing offset estimation when short training sequences are used.

The disclosed invention provides a system, a method and a computer program product for achieving the above-mentioned objectives. The disclosed invention first obtains a corrected received signal by shifting a received signal by a pre-estimated timing offset. The disclosed invention further tracks the pre-estimated timing offset in two steps: a coarse estimation step and a refinement step. In the coarse estimation step, a first estimate of the deviation in the pre-estimated timing offset is selected out of a plurality of probable deviations using an error factor corresponding to each probable deviation. The error factor corresponding to a probable deviation is a measure of the closeness between the corrected received signal shifted through the probable deviation and an expected signal corresponding to the probable deviation. The expected signal is calculated using an estimate of the channel and the training sequence. The deviation yielding the optimum value of the error factor is selected as the first estimate of the deviation in the pre-estimated timing offset. In the refinement step, a set of closely spaced probable deviations in the proximity of the first estimate is considered. Thereafter, the correlation values between the training sequence and the corrected received signal shifted through each of the closely spaced deviations are determined. The closely spaced deviation yielding the maximum of correlation peaks is identified as the improved estimate of the deviation in timing offset.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The disclosed invention provides a system, a method and a computer program product for data-aided timing offset estimation for frequency selective fading channels. The disclosed invention estimates the channel transfer function for accurate timing offset estimation for frequency selective fading channels. Further, as the estimation of the channel is a computationally complex task, the disclosed invention uses the channel estimation only for coarsely estimating of the timing offset. The coarse estimate of the timing offset is then refined using a computationally efficient synchronization technique.

Figure 1A:
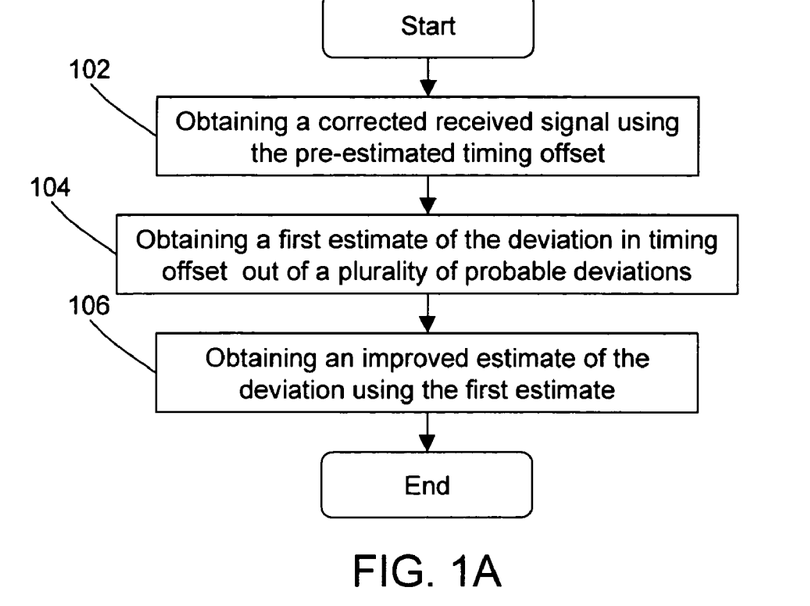
FIG. 1A is a flowchart illustrating a data-aided method of tracking the timing offset in accordance with the disclosed invention.

Referring now to FIG. 1A, a data-aided method of tracking the timing offset in accordance with the disclosed invention is hereinafter described. The method of obtaining a timing offset estimate at an occurrence of the training sequence is first described. At step 102, the received signal is first shifted through the pre-estimated timing offset to obtain a corrected received signal r(n), where n denotes the discrete time instant under consideration. The method uses the timing offset value tracked at the previous occurrence of the training sequence as a pre-estimate of the timing offset. Alternatively, the method uses the timing offset estimate obtained during acquisition as the pre-estimate of the timing offset. The disclosed invention then accomplishes the task of tracking the pre-estimated timing offset using the corrected received signal in the following two steps. At the first step 104, a plurality of probable deviations m in the pre-estimated timing offset is considered and one of the probable deviations is identified as a first estimate of the deviation in timing offset $m_{opt}$. The plurality of probable deviations is contained in a possible range of values [−M,M]. To illustrate the disclosed invention with an example it is assumed that the probable deviations are spaced regularly in the above-mentioned range. Step 104 of obtaining a first estimate of the deviation is further explained with reference to FIG. 1B. Once a first estimate of the deviation is obtained, an improved estimate of the deviation is determined using the first estimate of the deviation at step 106. The step 106 of obtaining an improved estimate of the deviation is further explained with reference to FIG. 5.

Figure 1B:
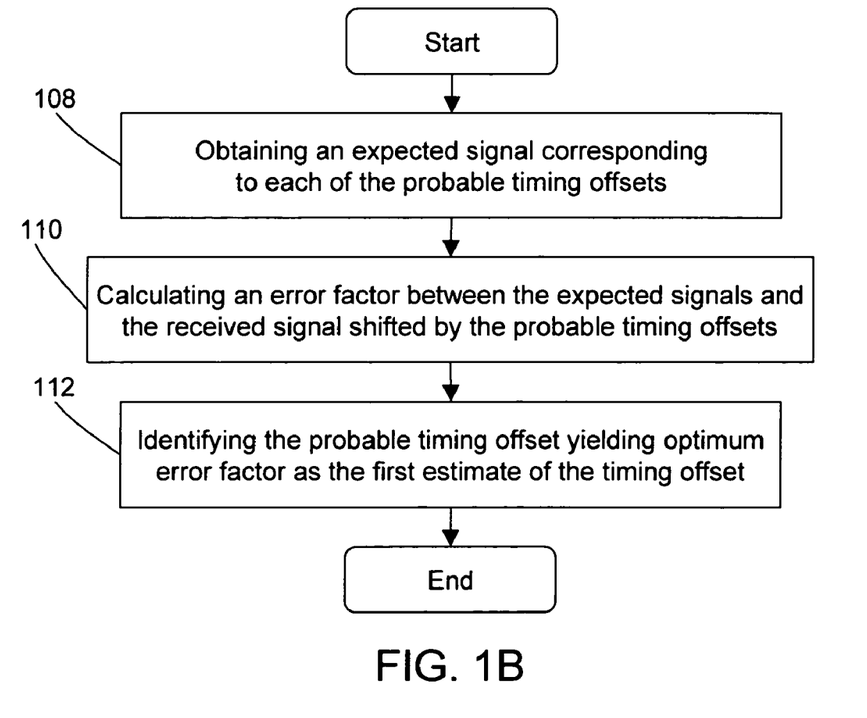
FIG. 1B is a flowchart illustrating a method of obtaining the first estimate of deviation in a pre-estimated timing offset in accordance with the disclosed invention.

Referring now primarily to FIG. 1B, a method of obtaining the first estimate of the deviation in accordance with the disclosed invention is hereinafter described. The method involves considering a plurality of probable deviations [−M, M]. At step 108, an expected signal $\hat{r}_i(n)$ corresponding to a considered probable deviation m is obtained using a training sequence $I_{tr}(n)$ and a channel estimate $\hat{h}_m(n)$. The expected signal $\hat{r}_m(n)$ is the signal that should ideally be received if the deviation in timing offset is equal to the considered probable deviation m. The step 108 of obtaining expected signal $\hat{r}_m(n)$ is explained in detail with reference to FIG. 3A. Thereafter, an error factor E(m) between expected signal $\hat{r}_m(n)$ and the shifted received signal r(n−m) is obtained at step 110, wherein r(n−m) denotes the received signal r(n) shifted by the considered probable deviation m. Error factor E(m) is a measure of closeness between these two signals. Hence, an optimal value of the error factor corresponds to the best estimate of the actual deviation in timing offset. In an embodiment of the disclosed invention, the square error between shifted received signal r(n−m) and expected signal $\hat{r}_m(n)$ is used as the error factor. This embodiment is further explained with reference to equation (1). The steps 108 and 110 are repeated for each of the probable deviations m∈[−M, M]. In an alternative embodiment of the disclosed invention the steps 108 and 110 are performed for each of the probable deviations m∈[−M,M] in parallel. Finally at step 112, the probable deviation m yielding optimum error factor E(m) is identified as the first estimate of the deviation $m_{opt}$.

Figure 2:
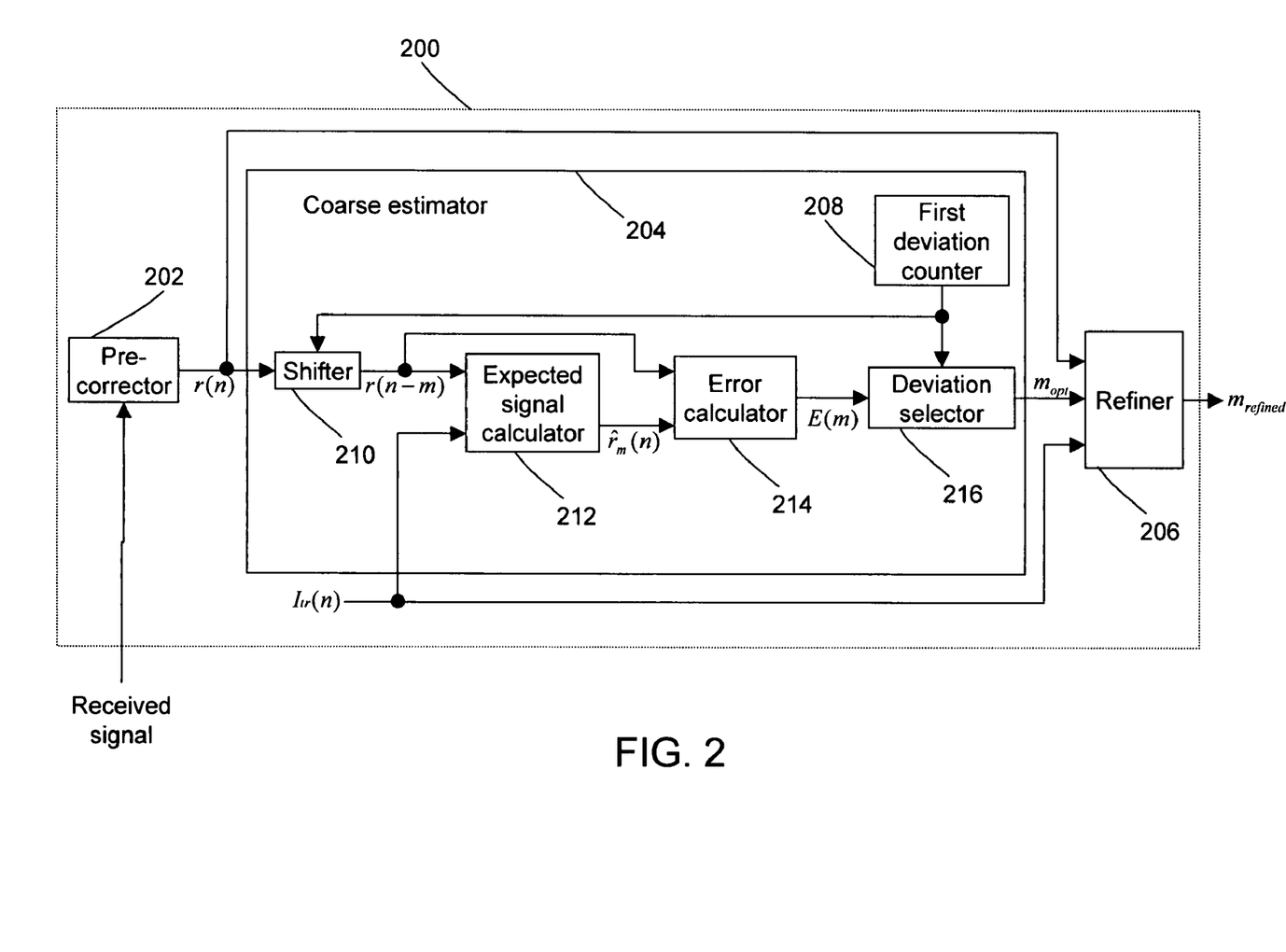
FIG. 2 is a block diagram illustrating a system for data-aided tracking of the timing offset in accordance with the disclosed invention.

Referring now primarily to FIG. 2, a system for data-aided tracking of the timing offset in accordance with the disclosed invention, timing offset tracker 200, is hereinafter described. The timing offset tracker 200 comprises a pre-corrector 202, a coarse estimator 204 and a refiner 206. Pre-corrector 202 shifts the received signal through the pre-estimated timing offset to obtain corrected received signal r(n). Coarse estimator 204 uses corrected received signal r(n) and training sequence $I_{tr}(n)$ to obtain a first estimate of the deviation $m_{opt}$ in the timing offset. Refiner 206 then obtains an improved estimate of the deviation $m_{refined}$ using the first estimate $m_{opt}$.

FIG. 2 also shows a first deviation counter 208, a shifter 210, an expected signal calculator 212, an error calculator 214 and a deviation selector 216 constituting coarse estimator 204. Each count of first deviation counter 208 corresponds to a probable deviation. For each occurrence of the training sequence, first deviation counter 208 produces the count to consider all probable deviations. For a considered probable deviation m, shifter 210 shifts corrected received signal r(n) through probable deviation m to obtain a shifted received signal r(n−m). Expected signal calculator 212 calculates an expected signal $\hat{r}_m(n)$ for a considered probable deviation m using channel estimate $\hat{h}_m(n)$ and training sequence $I_{tr}(n)$. Once expected signal $\hat{r}_m(n)$ is calculated, error calculator 214 finds error factor E(m) between the shifted received signal r(n−m) and the expected signal $\hat{r}_m(n)$. Expected signal calculator 212 and error calculator 214 together with first deviation counter 208 obtain error factor E(m) corresponding to each of the considered probable deviations. Thereafter, deviation selector 216 identifies the probable deviation yielding the optimum value of error factor E(m) as the first estimate of the timing offset deviation $m_{opt}$.

In an alternative embodiment of the disclosed invention, coarse estimator 204 comprises a plurality of expected signal calculators 212 and corresponding error calculators 214. Each expected signal calculator 212 calculates the expected signal corresponding to a probable deviation. Subsequently, the corresponding error calculator 214 calculates the error factor between the calculated expected signal and the corrected received signal shifted through the corresponding probable deviation. The plurality of expected signal calculators and corresponding error calculators operate in a manner such that the error factors are calculated for each of the probable deviation values in parallel.

In accordance with an embodiment of the disclosed invention, step 108 of obtaining the error factor E(m) is performed by calculating the square error between the shifted received signal r(n−m) and the expected signal $\hat{r}_m(n)$. This is done using the following equation:

$$E(m) = \sum_n (r(n-m) - \hat{r}_m(n))^2 \quad (1)$$

In accordance with this embodiment of the disclosed invention error calculator 214 comprises a square error calculating block, which calculates the square error between shifted received signal r(n−m) and expected signal $\hat{r}_m(n)$ using equation (1).

Figure 3A:
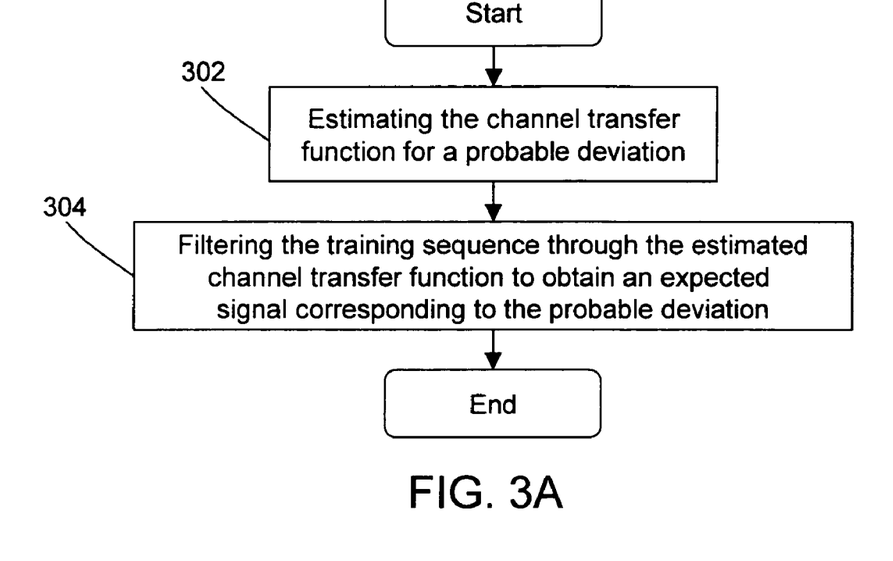
FIG. 3A is a flowchart illustrating a method of obtaining an expected signal for a probable deviation in pre-estimated timing offset.

Referring now primarily to FIG. 3A, a method of obtaining an expected signal $\hat{r}_m(n)$, corresponding to the considered probable deviation m in accordance with an embodiment of the disclosed invention is hereinafter described. To account for the frequency selective fading in the channel, expected signal $\hat{r}_m(n)$ is calculated using a channel estimate. At step 302, a transfer function $\hat{h}_m(n)$ of the channel is estimated assuming the deviation in timing offset to be equal to considered probable deviation m. Various methods of estimating the channel are known in the art and can be used for channel estimation at step 302. An embodiment of the invention using one such approach is described with reference to FIG. 4. Thereafter, at step 304, training sequence $I_{tr}(n)$ is filtered through estimated channel transfer function $\hat{h}_m(n)$ to obtain expected signal $\hat{r}_m(n)$ corresponding to the probable deviation m:

$$\hat{r}_m(n) = \hat{h}_m(n) * I_{tr}(n) \quad (2)$$

Figure 3B:
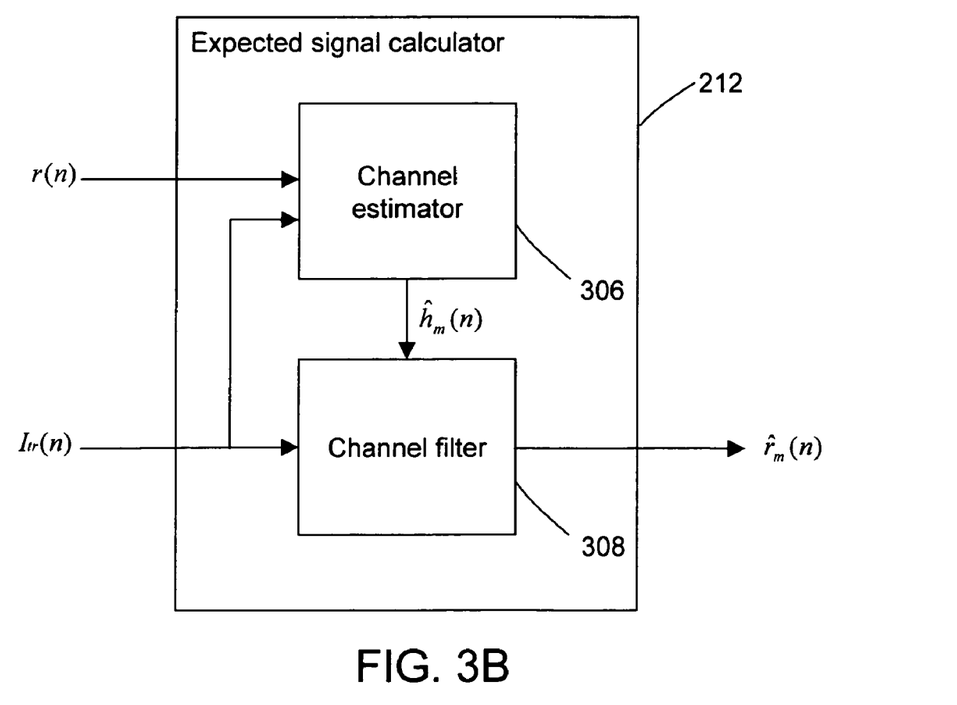
FIG. 3B is a block diagram illustrating a system for obtaining an expected signal for a probable deviation in pre-estimated timing offset.

Referring now primarily to FIG. 3B, expected signal calculator 212 is hereinafter described in accordance with an embodiment of the disclosed invention. Expected signal calculator 212 comprises a channel estimator 306 and a channel filter 308. Channel estimator 306 estimates the channel transfer function $\hat{h}_m(n)$ corresponding to a probable deviation m being considered using training sequence $I_{tr}(n)$. Channel filter 308 then filters training sequence $I_{tr}(n)$ through estimated channel transfer function $\hat{h}_m(n)$. The output of channel filter 308 is the expected signal $\hat{r}_m(n)$ corresponding to the considered probable deviation m.

Figure 4:
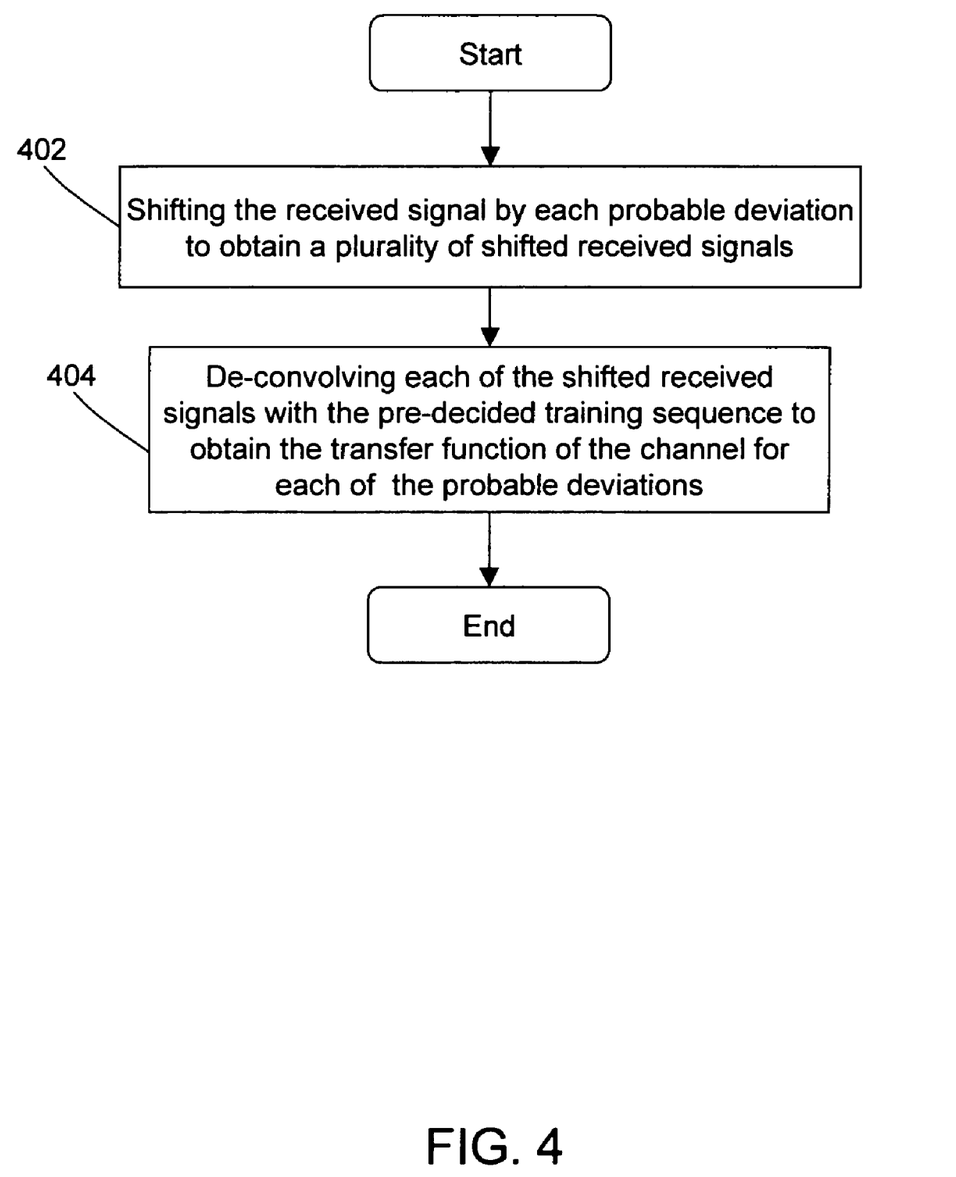
FIG. 4 is a flowchart illustrating the method of estimating the channel transfer function.

Referring now primarily to FIG. 4 a method of estimating the channel transfer function in accordance with an embodiment of the disclosed invention is hereinafter described. At step 402, corrected received signal r(n) is shifted through probable deviation m being considered to obtain shifted received signal r(n−m). At step 404, shifted received signal r(n−m) is de-convolved with training sequence $I_{tr}(n)$ to obtain estimated channel transfer function $\hat{h}_m(n)$ corresponding to probable deviation m being considered. In one embodiment of the disclosed invention, the channel is modeled as a 2P+1 coefficient finite impulse response (FIR) filter for de-convolving. In this channel model, the channel taps are obtained in de-convolving step 404 using the following equation:

$$\hat{h}_m(p) = \sum_{k=0}^{L_{tr}-1} I_{tr}^*(k) * r_{tr}(k+m+p), \ p \in [-P, P] \quad (3)$$

In accordance with this embodiment of the disclosed invention, channel estimator 306 comprises a de-convolving block. The de-convolving block determines the channel transfer function $\hat{h}_m(n)$, corresponding to the probable deviation m being considered, using the equation (3). The method of obtaining the channel transfer function disclosed here is for illustrating the disclosed invention and in no way limits the scope of the invention, which can be implemented with various other methods of obtaining the channel transfer function.

Figure 5:
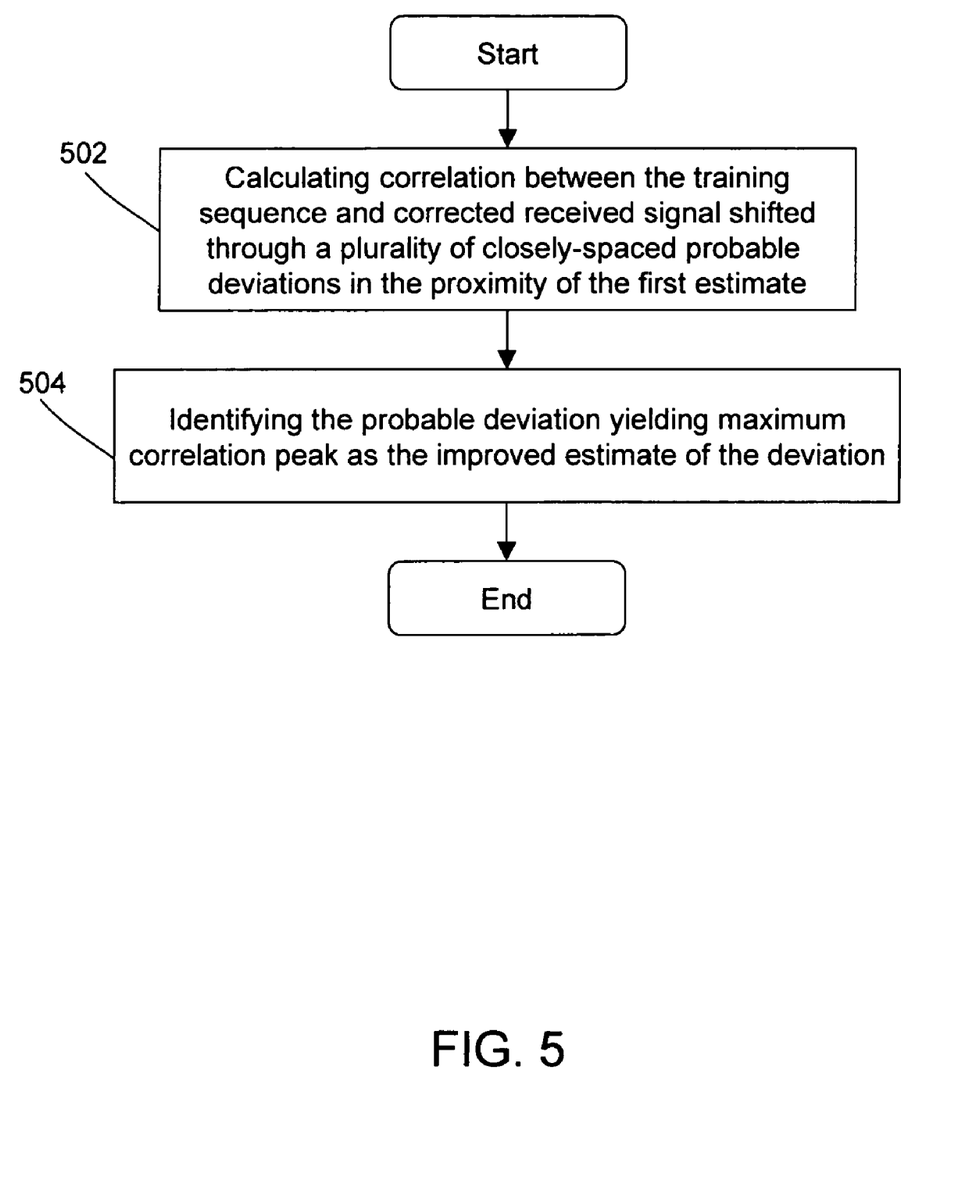
FIG. 5 is a flowchart illustrating a method of obtaining an improved estimate of the deviation in pre-estimated timing offset.

Referring now primarily to FIG. 5 a method of obtaining the improved estimate $m_{refined}$ of the deviation in accordance with an embodiment of the disclosed invention is hereinafter described. After first estimate of the deviation $m_{opt}$ is obtained in step 104, a plurality of closely spaced probable deviations in the pre-estimated timing offset are considered in the proximity of first estimate $m_{opt}$. Corrected received signal r(n) is then shifted through each of the closely spaced probable deviations to obtain a plurality of closely shifted received signals. Thereafter at step 502, correlations between each of the closely shifted received signals and training sequence $I_{tr}(n)$ is determined for each of the closely spaced probable deviations. The closely spaced probable deviation that yields maximum of correlation peaks is identified as the improved estimate $m_{refined}$ of the deviation at step 504. The closely spaced probable deviations are chosen depending on the accuracy desired for improved estimate $m_{refined}$. For example, an accuracy of ½Q is attained by performing the step of fine estimation at an over sampling rate of Q i.e. by choosing the closely spaced probable deviations at an interval of 1/Q. The above-mentioned method of obtaining an improved estimate of the deviation is described for illustrating the disclosed invention and in no way limit the scope of the invention, which can be implemented with any other computationally efficient method of timing offset estimation. In an alternative embodiment least square error, least mean square error and recursive least square error techniques can be optionally used for obtaining the improved estimate of the timing offset.

Figure 6:
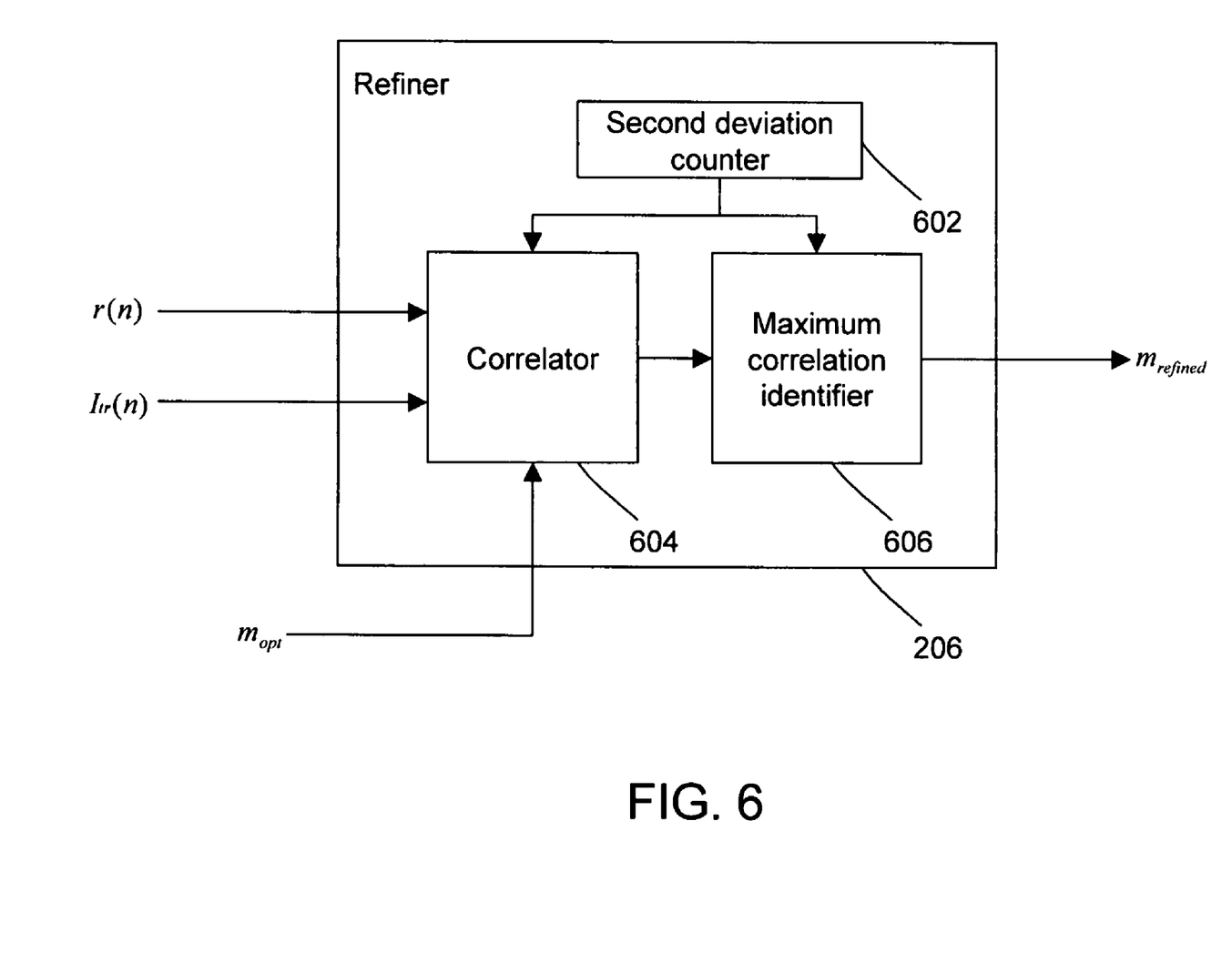
FIG. 6 is a block diagram illustrating a system for obtaining an improved estimate of the deviation in pre-estimated timing offset.

Referring now primarily to FIG. 6, refiner 206 in accordance with the disclosed invention is hereinafter described. Refiner 206 comprises a second deviation counter 602, a correlator 604 and a maximum correlation identifier 606.

Each count of second deviation counter 602 corresponds to a probable closely spaced deviation. For each occurrence of the training sequence, second deviation counter 602 produces the count to consider all probable closely spaced deviations. Correlator 604 calculates the correlation between corrected received signal r(n) shifted through a closely spaced probable deviation, and the training sequence $I_{tr}(n)$. These correlation values are then used by maximum correlation identifier 606 to find the closely spaced probable deviation yielding the maximum correlation as the improved estimate $m_{refined}$ of the deviation.

The disclosed invention may be implemented using a dedicated Application Specific Integrated Circuit (ASIC). Alternately, it may be implemented using a Digital Signal Processor (DSP) chip or a Field Programmable Gate Array (FPGA). It would be apparent to anyone skilled in the art that the disclosed invention may also be embodied in a computer program product using either a processor specific assembly language or a high-level language such as C. The computer program product embodiment of the disclosed invention can be used for either the implementation of a timing offset estimator, or for implementation of a simulation model of the timing offset estimator.

The disclosed system, method and computer program product achieve accurate timing offset estimation in frequency selective fading environment while retaining computational efficiency. The calculation of channel transfer function in the timing offset estimation process results in high accuracy in frequency selective fading conditions. As the method of channel estimation is a computationally complex one, the timing estimation is performed in two steps. The first step estimates the timing offset using the channel transfer function while the second step uses the relatively faster correlation technique. The interval between the probable timing offsets used in first step can be chosen depending on the desired accuracy level and available processing resources. For example, in a GSM receiver timing offset estimate at an accuracy of ±½ symbol can be carried out in the first step while achieving finer estimation in the relatively faster second step. Thus, the disclosed invention achieves a high level of accuracy in timing offset estimation while still retaining computational efficiency.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A data-aided method of tracking the timing offset between a transmitted signal having a training sequence and a received signal using a pre-estimated timing offset, the method comprising the steps of:
   a. obtaining a corrected received signal using the received signal and the pre-estimated timing offset;
   b. obtaining a first estimate of the deviation in the pre-estimated timing offset out of a plurality of probable deviations by performing the steps of:
      i. de-convolving the corrected received signal shifted through the first probable deviation with the training sequence to obtain an estimated channel transfer function;
      ii. filtering the training sequence through the estimated transfer function to obtain an expected signal corresponding to the first probable deviation;
      iii. calculating an error factor between the expected signal and the corrected received signal shifted through the first probable deviation; performing steps i-iii for each probable deviation; and
      iv. identifying the probable deviation yielding the optimum value of error factor as the first estimate of the deviation; and
   c. obtaining an improved estimate of the deviation using the corrected received signal and the first estimate of the deviation.

2. The method as recited in claim 1 wherein the step of obtaining an improved estimate of the deviation comprises the steps of:
   a. calculating the correlation between the training sequence and the corrected received signal shifted through a plurality of closely-spaced probable deviations, the plurality of probable deviations selected in proximity to the first estimate of the deviation; and
   b. identifying the closely-spaced probable deviation yielding the maximum correlation as the improved estimate of the deviation.

3. The method as recited in claim 1 wherein the step of calculating the error factor is performed by calculating the square error between the expected signal corresponding to the probable deviation and corrected received signal shifted through the probable deviation.

4. The method as recited in claim 1 wherein at least one of the steps is embodied in a computer program product.

5. A system for data-aided tracking of the timing offset between a transmitted signal having a training sequence and a received signal using a pre-estimated timing offset, the system comprising:
   a. a pre-corrector obtaining a corrected received signal using the received signal and the pre-estimated timing offset;
   b. a coarse estimator obtaining a first estimate of the deviation in the pre-estimated timing offset out of a plurality of probable deviations, the coarse estimator comprising:
      i. de-convolving block de-convolving the corrected received signal shifted through a probable deviation with the training sequence to obtain an estimated channel transfer function corresponding to the probable deviation;
      ii. a channel filter filtering the training sequence through the estimated channel transfer function to obtain an expected signal corresponding to the probable deviation;
      iii. an error calculator calculating an error factor between the expected signal corresponding to a probable deviation and the corrected received signal shifted through the probable deviation; and
      iv. a deviation selector identifying the probable deviation yielding the optimum value of error factor as the first estimate of the deviation; and
   c. a refiner obtaining an improved estimate of the deviation using the corrected received signal and the first estimate of the deviation.

6. The system as recited in claim 5 wherein the refiner comprises:
   a. a correlator calculating correlation between the training sequence and the corrected received signal shifted through a plurality of closely-spaced probable deviations in the proximity of the first estimate of the deviation; and b. a maximum correlation identifier identifying the closely-spaced deviation yielding the maximum correlation as the improved estimate of the deviation.

7. The system as recited in claim 5 wherein the error calculator comprises a square error calculating block calculating the square error between the expected signal corresponding to a probable deviation and the corrected received signal shifted through the probable deviation.

\* \* \* \* \*